May 23, 1961

D. A. AYER 2,985,367

RAFTER CALCULATOR

Filed Nov. 18, 1957

INVENTOR.
DORIS A. AYER

BY *Lothrop & West*

ATTORNEYS

May 23, 1961  D. A. AYER  2,985,367
RAFTER CALCULATOR
Filed Nov. 18, 1957  2 Sheets-Sheet 2

INVENTOR.
DORIS A. AYER

BY *Lothrop & West*

ATTORNEYS

United States Patent Office 2,985,367
Patented May 23, 1961

2,985,367
RAFTER CALCULATOR

Doris A. Ayer, Canyondam, Calif., assignor, by mesne assignments, to Plumas Tool & Instrument Mfg. Co. Inc., Greenville, Calif.

Filed Nov. 18, 1957, Ser. No. 697,118

1 Claim. (Cl. 235—87)

The invention relates generally to an apparatus for determining the magnitude of the length variable corresponding to predetermined factors of roof pitch and span, and more particularly, to a device for quickly ascertaining precise values of rafter lengths with known values of roof span and pitch.

It is an object of the invention to provide a rafter calculator which is compact and light and which therefore can conveniently be used either in an office or in the field where construction work is being undertaken.

It is another object of the invention to provide a rafter calculator which is relatively economical to make.

It is a further object of the invention to provide a rafter culculator which will save substantial amounts of time in calculating rafter lengths.

It is yet a further object of the invention to provide a rafter calculator which has but few moving parts to get out of order and which is therefore durable and long-lived.

It is still another object of the invention to provide a rafter calculator which can be used even by a relatively unskilled person, and after but a minimum of instruction, with accurate results.

It is another object of the invention to provide a generally improved rafter calculator.

Other objects, together with the foregoing, are attained in the embodiment described in the following description and shown in the accompanying drawings in which.

Figure 1:
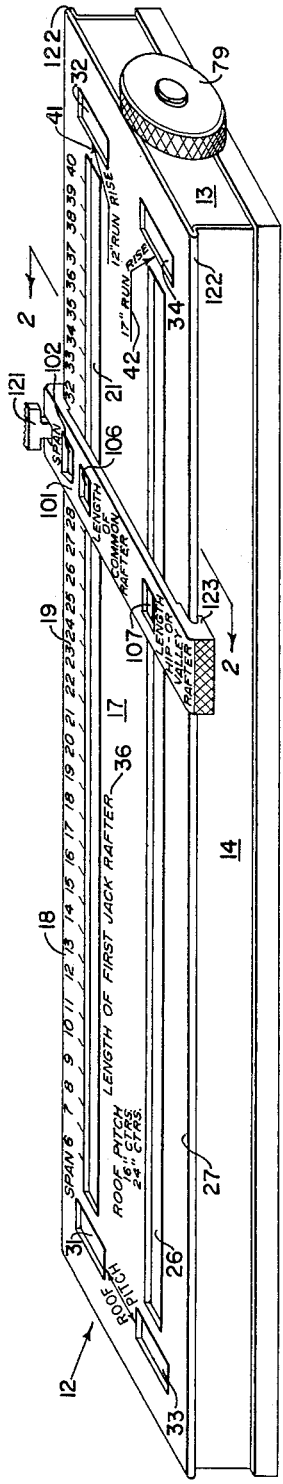
Figure 1 is a perspective of the calculator.
Figure 2:
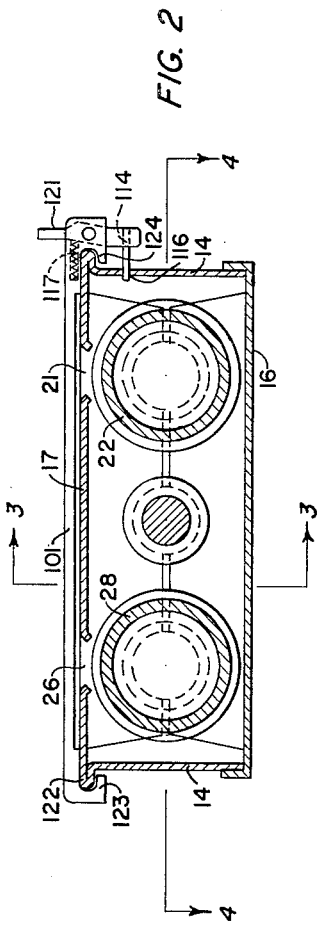
Figure 2 is a transverse section, the plane of section being indicated by the line 2—2 in Figure 1.
Figure 3:
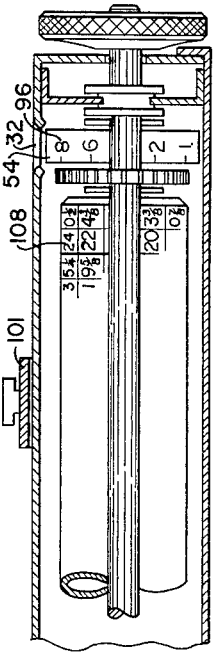
Figure 3 is a longitudinal section, the plane of section being indicated by the line 3—3 in Figure 2, a portion of the figure being broken away to reduce its extent.
Figure 3:
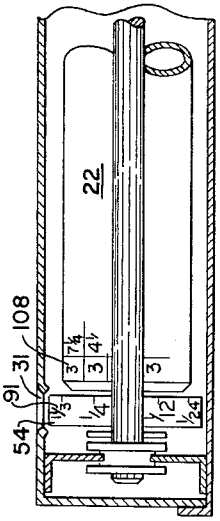
Figure 4:
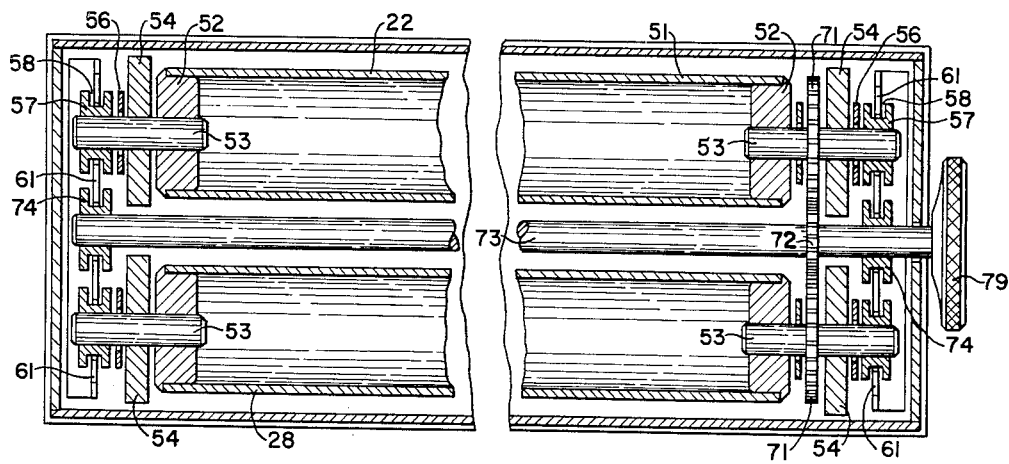
Figure 4 is a horizontal section, the plane of section being indicated by the line 4—4 in Figure 2, a portion of the figure being broken away to reduce its extent.

While the rafter calculator of the invention is susceptible of numerous physical embodiments, substantial numbers of the herein shown and described embodiments have been made and used and have performed in an eminently satisfactory fashion.

The rafter calculator housing generally designated by the numeral 12, is of convenient elongated shape and size and includes a pair of end walls 13, a pair of side walls 14, a bottom panel 16, and a top panel 17, or face plate. Scribed on the far margin 18 of the face plate is a plurality of indicia 19 showing progressive values of the customarily encountered roof spans, for example from six to forty feet.

Parallel to the row of indicia 19 is a first or upper longitudinal slot 21 in the face plate, the slot enabling the user to view data appearing on an underlying first or upper drum 22. In comparable fashion a lower or second longitudinal slot 26 adjacent the near margin 27 of the face plate permits observation of data on a second or near drum 28.

Adjacent the ends of the far slot 21 is a pair of openings 31 and 32 while a pair of similar openings 33 and 34 is located at the opposite ends of the near slot 26.

While not vital to the operation of the calculator it has been found that indicia 36 on the face plate showing the length of the first jack rafter for various roof pitches and ordinary lengths between centers is of great convenience to the user. For similar reasons various notes and instructions for use (not shown) are scribed on the face plate.

Pointing to the left hand openings 31 and 33 is the scribed legend "Roof Pitch," as appears in Figure 1. Visually indicating a run of twelve inches and pointing to the center of the right hand opening 32 is an indicia 41. In comparable fashion, an indicia 42 points to the center of the opening 34, the run in this instance being seventeen inches.

Underlying each of the longitudinal slots 21 and 26, as previously mentioned, are the drums 22 and 28, respectively. Each of the drums extends substantially the length of the housing and each is rotatably mounted on the housing in identical fashion. A description of one, therefore, will serve also to describe the other. Preferably, the drum comprises a hollow right circular cylinder 51 closed at opposite ends by a pair of plugs 52. Coaxially mounted in each of the plugs 52 is a stub shaft 53 having secured thereto a wheel 54. Outboard of each of the wheels 54, in turn, is a washer 56. Adjacent each of the washers 56 is a bearing 57 having a central annular slot 58, the bearings being supported at each end by a bearing support plate 61 and a bearing keeper plate 62, the plates 61 and 62 each having appropriate registering arcuate notches 66 and 67, respectively disposed in the bearing slots 58.

Figure 5:
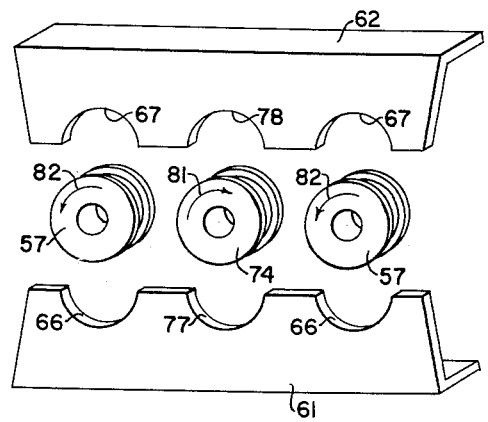
Figure 5 is an exploded perspective of the bearing structure.
Figure 6:
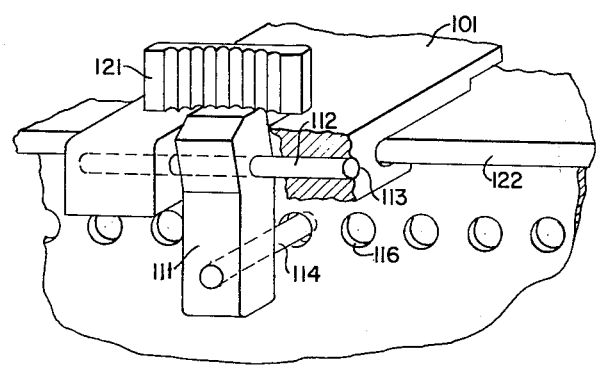
Figure 6 is a fragmentary perspective of the latching mechanism, a portion of the structure being broken away more clearly to reveal the underlying members.

Means for rotating the drums 22 and 28 in unison is also provided. Mounted adjacent one end of each of the stub shafts 53 is a pinion gear 71, each of the gears 71 being in engagement, on opposite sides, with a drive gear 72 mounted on a central drive shaft 73 having a pair of slotted bushings 74 appropriately mounted in a pair of arcuate notches 77 and 78 in the bearing plates 61 and 62, respectively. The shaft 73 extends exteriorly of the end wall 13 of the housing and has mounted thereon a rotating or drive knob 79. As is apparent in Figure 5, as the shaft 73 and bearing 74 is rotated in the direction of the arrow 81 the two bearings 57 and thus the two drums 22 and 28 are rotated in the opposite direction indicated by the arrows 82, the gear arrangement effecting this result.

Consequently, as the knob 79 is rotated in one direction the two drums are rotated in unison in the opposite direction. This motion enables the user, by appropriate knob rotation to turn the drums until the appropriate roof pitch values are observed through the openings 31, 32, 33, or 34. The left-hand openings 31 and 33 enable the viewer to observe direct readings of roof pitch indicia 91 scribed on the left-hand wheels 54, or dials, whereas the right-hand openings 32 and 34 permit a view of the rise and run indicia 96 marked on the right-hand wheels 54.

Having set the desired value of roof slope either in terms of roof pitch or roof rise and run, the user, knowing the span, moves a transverse member termed a traverse frame 101, or bar, to a location such that the span window 102 in the frame is placed over the known span value.

Thereupon, by reference to a common rafter window 106 or hip or valley rafter window 107, the appropriate indicia 108 marked on the underlying drum surface can be directly read to obtain the rafter length required.

Conveniently, the frame 101 is lockable, a latch 111 rotatably mounted on a pin 112 driven through an opening 113 across the far end of the frame 101 having mounted thereon a latch bar 114 inserted through one of a plurality of apertures 116 in the far side wall 14 of the housing, a suitable spring 117 urging the bar 114 into the aperture 116. A finger operator 121 enables the user to overcome spring pressure and swing the bar 114 out of the aperture 116 and thence to slide the frame 101 along the face plate, suitable flanges 122 on opposite sides of the face plate being in tracking engagement with recurved portions 123 and 124 on opposite ends of the traverse frame.

It can therefore be seen that I have provided a rafter calculator which is not only convenient to operate but which is also extremely fast and accurate in use.

What is claimed is:

A rafter calculator comprising an elongated housing including a face plate, said face plate having etched thereon along one margin a plurality of indicia designating roof spans in progressive increments, said face plate including a first longitudinal slot and a first tranverse opening adjacent each end of said first longitudinal slot, said face plate also including a second longitudinal slot and a second transverse opening adjacent each end of said second longitudinal slot, a first drum rotatably mounted on bearings in said housing, said first drum having marked thereon a plurality of longitudinal rows of indicia designating common rafter length adapted to be visible through said first slot as said first drum is rotated to a predetermined position, a first pair of dial wheels mounted coaxially with and one at each end of said first drum, each of said first dial wheels having roof pitch indicia thereon adapted to be visible through the adjacent of said first openings, a second drum rotatably mounted in bearings in said housing, said second drum having marked thereon a plurality of longitudinal rows of indicia designating hip/valley rafter length adapted to be visible through said second slot as said second drum is rotated to a predetermined position, a second pair of dial wheels mounted coaxially with and one at each end of said second drum, each of said second dial wheels having roof pitch indicia thereon adapted to be visible through the adjacent of said second openings, a shaft rotatably mounted in bearings in said housing and projecting exteriorly from said housing, said shaft being interposed between and in parallel relation to said drums, gear means on said drums and said shaft for simultaneously rotating said drums in one direction as said shaft is rotated in the opposite direction, a transverse frame slidably disposed on said face plate, said frame having a first aperture over said first longitudinal slot and a second aperture over said second longitudinal slot, and a third aperture over said margin of said face plate, said third aperture being formed so as to reveal therethrough a predetermined one of said underlying roof span indicia at a time, each of said apertures being aligned in a transverse plane whereby said first aperture and said second aperture disclose underlying indicia on said first drum and said second drum, respectively, corresponding to said predetermined roof span indicia, and means for locking said frame in a predetermined location along said face plate.

References Cited in the file of this patent

UNITED STATES PATENTS

| | | |
|---|---|---|
| 1,046,833 | Miller | Dec. 10, 1912 |
| 1,251,180 | Cantrell | Dec. 25, 1917 |
| 1,974,239 | Corbatchewsky | Sept. 18, 1934 |
| 2,239,344 | Sifrit | Apr. 22, 1941 |
| 2,969,180 | Ives | Jan. 24, 1961 |

FOREIGN PATENTS

| | | |
|---|---|---|
| 502,400 | Germany | July 15, 1930 |